US007024182B2

(12) United States Patent
Jackson et al.

(10) Patent No.: US 7,024,182 B2
(45) Date of Patent: Apr. 4, 2006

(54) SUBSCRIBER ACTIVATED, TIME LIMITED CELLULAR INCOMING CALL REDIRECTION SYSTEM

(75) Inventors: Lisa E. Jackson, Warrenville, IL (US); Norris Dwayne Turner, Bellwood, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 275 days.

(21) Appl. No.: 10/442,899

(22) Filed: May 20, 2003

(65) Prior Publication Data

US 2004/0235461 A1 Nov. 25, 2004

(51) Int. Cl.
*H04M 3/42* (2006.01)

(52) U.S. Cl. ...................... 455/417; 455/413; 455/445; 379/211.02

(58) Field of Classification Search ................ 379/211, 379/211.03; 455/414, 414.1
See application file for complete search history.

(56) References Cited

U.S. PATENT DOCUMENTS 6,072,865 A * 6/2000 Haber et al. ........... 379/211.02
6,622,016 B1 * 9/2003 Sladek et al. ............ 455/414.1
6,678,366 B1 * 1/2004 Burger et al. .......... 379/211.03
6,944,444 B1 * 9/2005 Gillespie et al. ............ 455/417
2003/0054865 A1 * 3/2003 Byers et al. ................ 455/567
2004/0198328 A1 * 10/2004 Brandenberger ......... 455/414.1

* cited by examiner

*Primary Examiner*—Fan Tsang
*Assistant Examiner*—Lisa Hashem

(57) ABSTRACT

The cellular call redirection system enables a subscriber to redirect all incoming calls directed to the subscriber's cellular telephone to an automated message system for a predetermined period of time. In addition, the calling party is connected to a voice announcement system which plays a message to the calling party to inform the calling party that the call has been redirected and provides information regarding the time remaining before the call redirection feature is automatically deactivated. This provides the calling party with an indication of the future time at which the subscriber is likely to be available to receive incoming calls. In addition, the cellular call redirection system maintains a count or queue of redirected incoming calls to thereby enable the subscriber to determine the number and identity of the calling parties who have attempted to contact the subscriber during the period that this feature has been activated.

8 Claims, 3 Drawing Sheets

SUBSCRIBER ACTIVATED, TIME LIMITED CELLULAR INCOMING CALL REDIRECTION SYSTEM

FIELD OF THE INVENTION

This invention relates to the provision of a called party activated call refusal service for a cellular telephone system.

PROBLEM

It is a problem that cell phone subscribers often receive telephone calls at times and locations where it is inconvenient or prohibited to receive incoming calls. Some examples of these inconvenient times are during meetings, meals, while driving, etc. while some examples of these prohibited locations are theatres, hospitals, and the like.

Existing cell phone systems provide the subscriber with the ability to turn off their cell phone and redirect the calling party to a voice messaging system to thereby avoid receiving incoming calls at times and locations where it is inconvenient or prohibited to receive incoming calls. However, the calling party receives no indication of the period of time that the subscriber is unable to receive incoming calls or when the subscriber is likely to respond to the voice message that is recorded by the calling party. In the case where the subscriber is unavailable for a brief period of time, the calling party is likely to remain available for a return telephone call from the subscriber or is willing to retry the subscriber if the time at which the subscriber becomes available is known. However, there is presently no capability for such information delivery to the calling party.

The subscriber in some systems has the ability to prerecord a message on their voice messaging system, but it is inconvenient for the subscriber to attempt to change the recorded message in every instance where the subscriber is temporarily unavailable and it is difficult for the subscriber to indicate the precise time at which the subscriber is expected to become available to receive incoming calls. This process, if even available, is unduly laborious and inconvenient for the subscribers.

There is a need for a system that provides a subscriber with the ability to provide a calling party with an indication of their future availability, which indication is accurate, simple to activate and automatically updated.

SOLUTION

The above problems are solved and a technical advance achieved by the present subscriber activated, time limited cellular call redirection system, termed "cellular call redirection system," which enables a subscriber to redirect all incoming calls directed to the subscriber's cellular telephone to an automated message system for a predetermined period of time. In addition, the calling party is connected to a voice announcement system which plays a message to the calling party to inform the calling party that the call has been redirected and provides information regarding the time remaining before the call redirection feature is automatically deactivated. This provides the calling party with an indication of the future time at which the subscriber is likely to be available to receive incoming calls. In addition, the cellular call redirection system maintains a count or queue of redirected incoming calls to thereby enable the subscriber to determine the number and identity of the calling parties who have attempted to contact the subscriber during the period that this feature has been activated.

DETAILED DESCRIPTION

Figure 1A:
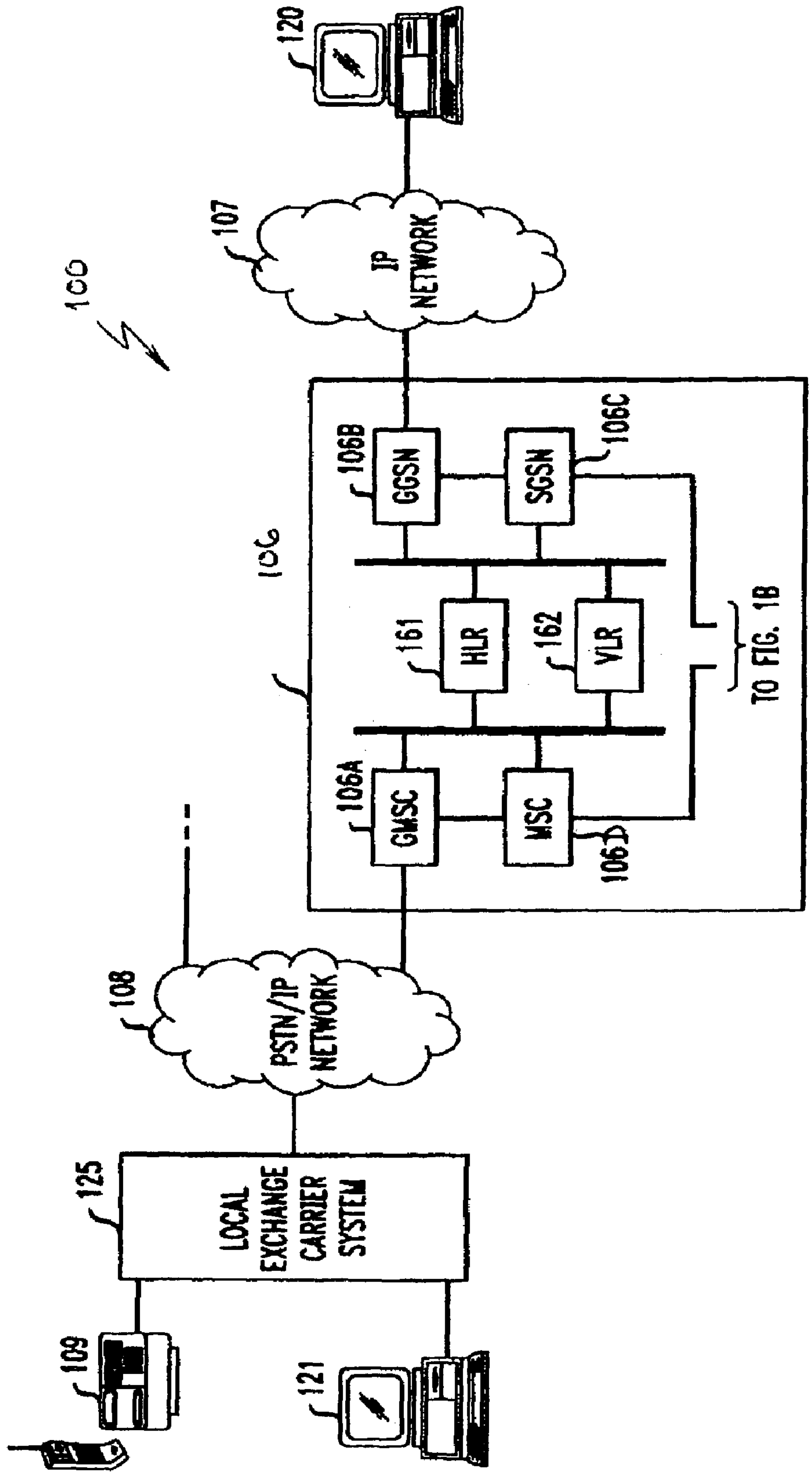
FIGS. 1A & 1B illustrate in block diagram for the overall architecture of a second generation (2G) cellular communication network that is equipped with the present subscriber activated, time limited cellular incoming call redirection system.
Figure 1B:
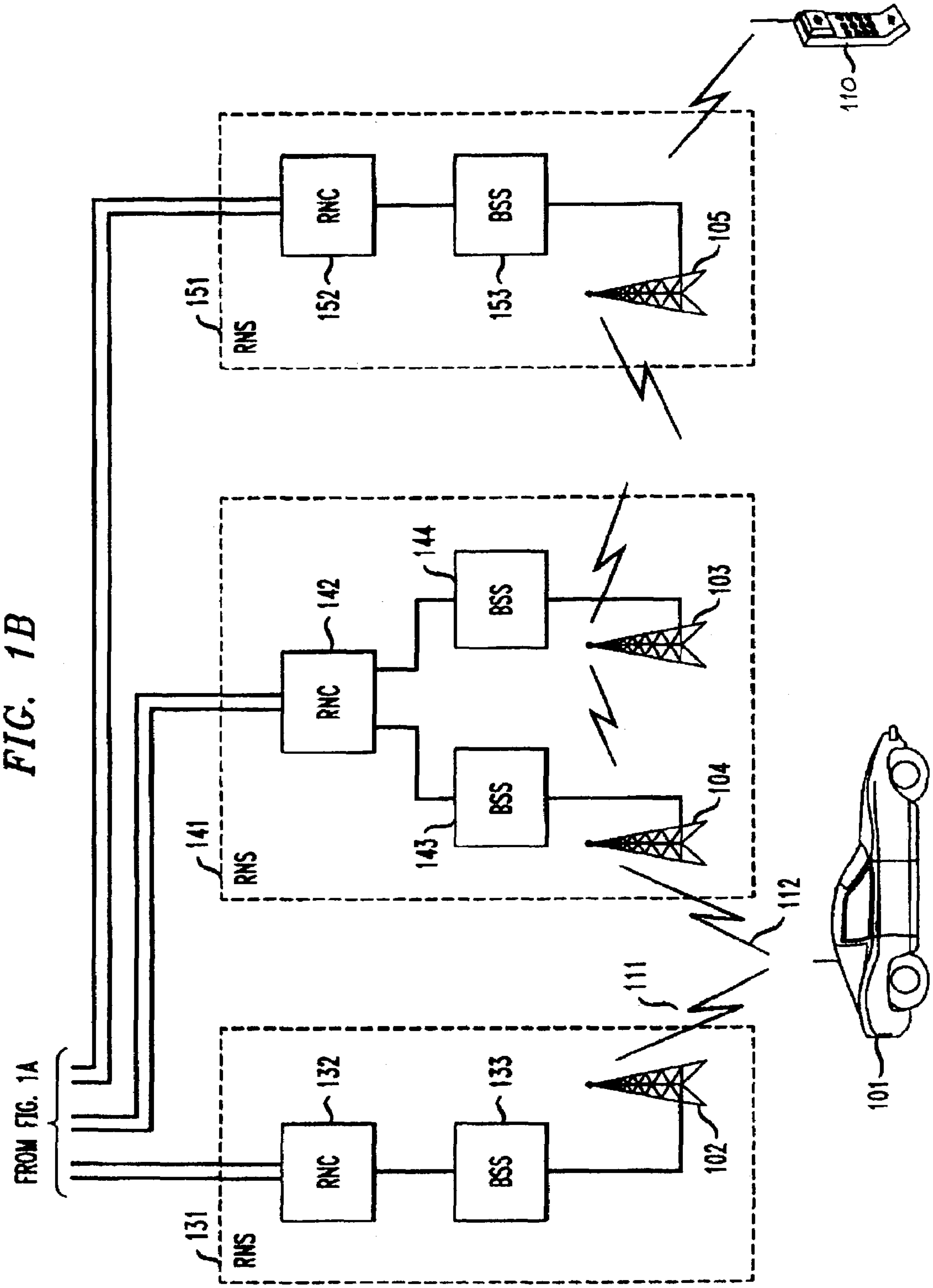

An example of a typical cellular communication network, as shown in block diagram form in FIG. 1, provides the service of connecting wireless telephone customers, each having a mobile subscriber station, to both land-based customers who are served by the Public Switched Telephone Network (PSTN) 108 as well as other wireless telephone customers. In such a network, all incoming and outgoing calls are routed through Mobile Switching Centers (MSC) 106, each of which is connected to a plurality of Radio Network Subsystems (RNS) 131–151 which communicate with mobile subscriber stations 101, 110 located in the area covered by the cell sites. The mobile subscriber stations 101, 110 are served by the Radio Network Subsystems (RNS) 131–151, each of which is located in one cell area of a larger service region. Each cell site in the service region is connected by a group of communication links to the Mobile Switching Center 106. Each cell site contains a group of radio transmitters and receivers, termed a "Base Station" (BSS) herein, with each transmitter-receiver pair being connected to one communication link. Each transmitter-receiver pair operates on a pair of radio frequencies to create a communication channel: one frequency to transmit radio signals to the mobile subscriber station and the other frequency to receive radio signals from the mobile subscriber station. The Mobile Switching Center 106, in conjunction with the Home Location Register (HLR) 161 and the Visitor Location Register (VLR) 162, manages subscriber registration, subscriber authentication, and the provision of wireless services such as voice mail, call forwarding, roaming validation and so on. The Mobile Switching Center 106 is connected to a Gateway Mobile Services Switching Center (GMSC) 106A as well as to the Radio Network Controllers, with the GMSC 106A serving to interconnect the Mobile Switching Center 106 with the PSTN 108. In addition, the Radio Network Controllers are connected via Serving GPRS Support Node (SGSN) 106C and thence the Gateway GPRS Support Node (GGSN) 106B to a network, for example the SS7 signaling network (not shown) or the PSTN 108. The Radio Network Controllers 132, 142, 152 control the transmitter-receiver pairs at the Base Station and the tuning of the mobile subscriber stations to the selected radio frequencies.

In FIG. 1, the mobile subscriber station 110 is simultaneously communicating with two Base Stations 133 & 143, thus constituting a soft handoff. However, a soft handoff is not limited to a maximum of two Base Stations. When in a soft handoff, the Base Stations serving a given call must act in concert so that commands issued over RF channels 111 and 112 are consistent with each other. In order to accomplish this consistency, one of the serving Base Stations may operate as the primary Base Station with respect to the other serving Base Stations. Of course, a mobile subscriber station 110 may communicate with only a single Base Station if this is determined to be sufficient by the cellular communication network.

The control channels that are available in this system are used to setup the communication connections between the mobile subscriber stations 110 and the Base Station 133. When a call is initiated, the control channel is used to communicate between the mobile subscriber station 110 involved in the call and the local serving Base Station 133. The control messages locate and identify the mobile subscriber station 110, determine the dialed number, and identify an available voice/data communication channel consisting of a pair of radio frequencies and orthogonal coding which is selected by the Base Station 133 for the communication connection. The radio unit in the mobile subscriber station 110 re-tunes the transmitter-receiver equipment contained therein to use these designated radio frequencies and orthogonal coding. Once the communication connection is established, the control messages are typically transmitted to adjust transmitter power and/or to change the transmission channel when required to handoff this mobile subscriber station 110 to an adjacent cell, when the subscriber moves from the present cell to one of the adjoining cells. The transmitter power of the mobile subscriber station 110 is regulated since the magnitude of the signal received at the Base Station 133 is a function of the mobile subscriber station transmitter power and the distance from the Base Station 133. Therefore, by scaling the transmitter power to correspond to the distance from the Base Station 133, the received signal magnitude at Base Station 133 can be maintained within a predetermined range of values to ensure accurate signal reception without interfering with other transmissions in the cell.

The voice communications between mobile subscriber station 110 and other subscriber stations, such as land line based subscriber station 109, is effected by routing the communications received from the mobile subscriber station 110 through the Mobile Switching Center 106 and trunks to the Public Switched Telephone Network (PSTN) 108 where the communications are routed to a Local Exchange Carrier 125 that serves land line based subscriber station 109. There are numerous Mobile Switching Centers 106 that are connected to the Public Switched Telephone Network (PSTN) 108 to thereby enable subscribers at both land line based subscriber stations and mobile subscriber stations to communicate between selected stations thereof. This architecture represents the present architecture of the wireless and wire-line communication networks.

However, there are many instances when the subscriber turns off their cell phone and redirects the calling party to a voice messaging system to thereby avoid receiving incoming calls at times and locations where it is inconvenient or prohibited to receive incoming calls. However, the calling party receives no indication of the period of time that the subscriber is unable to receive incoming calls or when the subscriber is likely to respond to the voice message that is recorded by the calling party.

Operation of the Cellular Call Redirection System

Figure 2:
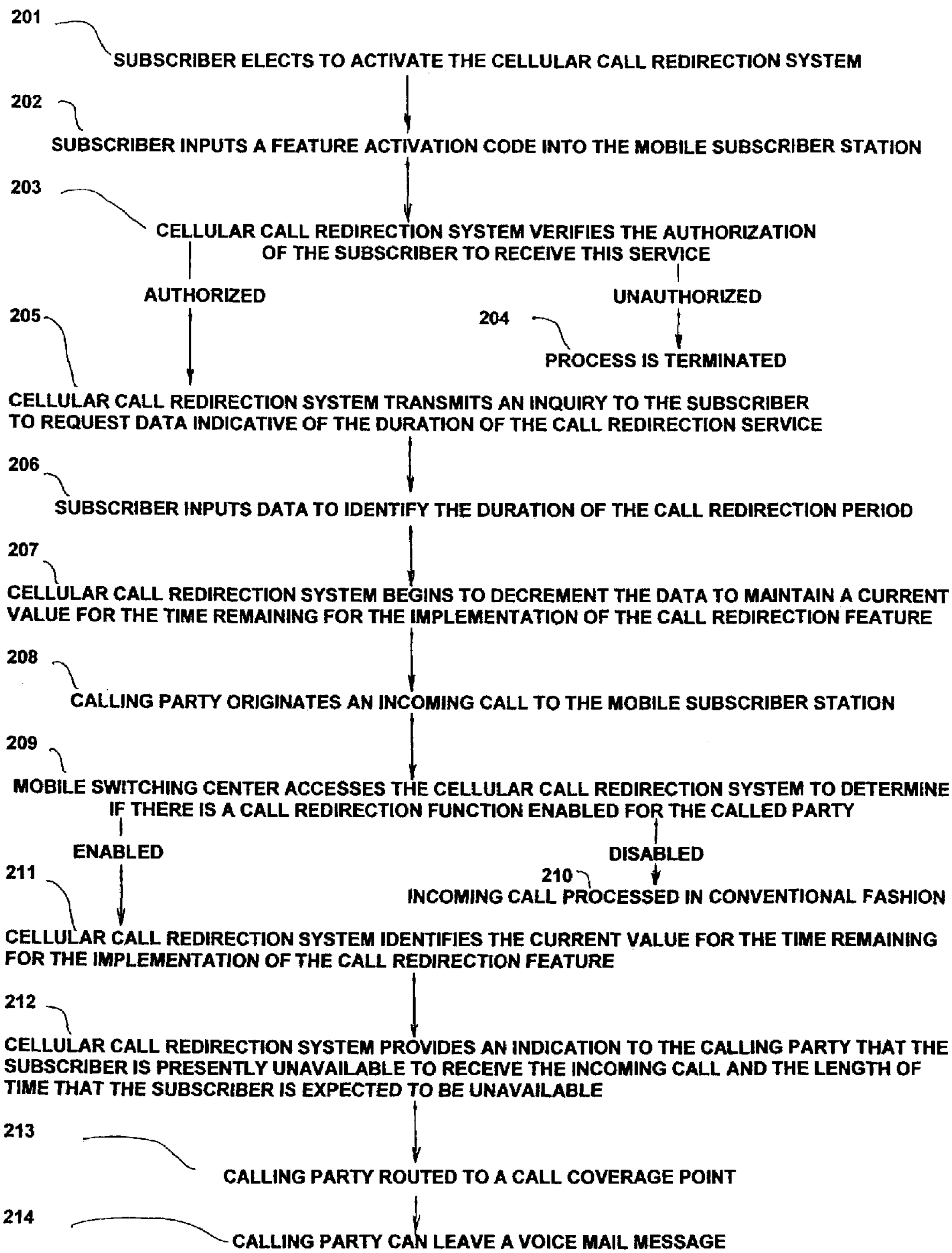
FIG. 2 illustrates in flow diagram form the operation of the present subscriber activated, time limited cellular incoming call redirection system.

The operation of the cellular call redirection system 102 is illustrated in flow diagram form in FIG. 2. At step 201, the subscriber at mobile subscriber station 110 elects to activate the cellular call redirection system 200, operational in the Mobile Switching Center 106 that presently serves the mobile subscriber station 110. The subscriber typically turns on mobile subscriber station 110 and inputs a feature activation code into the mobile subscriber station 110 at step 202 to signal the Mobile Switching Center 106 of the activation of the cellular call redirection feature. The cellular call redirection system 200 typically responds to the service request by verifying at step 203 the authorization of the subscriber to receive this service. If the subscriber is not authorized to receive this service, at step 204 the process is terminated and a message transmitted to the subscriber indicating that their request has been denied. If the subscriber is authorized to receive the call redirection service, then at step 205 the cellular call redirection system 200 transmits an inquiry to the subscriber at the mobile subscriber station 110 to request data indicative of the duration of the call redirection service. The inquiry can be a textual display for the screen of the mobile subscriber station 110 and/or an audible message. In response to the receipt of this inquiry, the subscriber inputs data into the mobile subscriber station 110 at step 206 to identify the duration of the call redirection period that is desired. The cellular call redirection system 200 stores this data in memory and begins to decrement the data at step 207 to maintain a current value for the time remaining for the implementation of the call redirection feature for mobile subscriber station 110.

At step 208, a calling party located at a subscriber station 101 originates an incoming call to the mobile subscriber station 110. In response to the receipt on an incoming call, the Mobile Switching Center 106 identifies the mobile subscriber station 110 at step 209 and uses this information to access the cellular call redirection system 200 to determine if there is a call redirection function enabled for mobile subscriber station 110. If not, as determined by the cellular call redirection system 200, the incoming call connection is processed in conventional fashion to interconnect the calling party with the subscriber located at mobile subscriber station 110 at step 210. If a call redirection function is enabled, the cellular call redirection system 200 must identify the current value for the time remaining for the implementation of the call redirection feature for mobile subscriber station 110 at step 211. At step 212, the cellular call redirection system 200 uses the current value for the time remaining for the implementation of the call redirection feature to provide an indication to the calling party that the subscriber is presently unavailable to receive the incoming call and the length of time that the subscriber is expected to be unavailable. The incoming call connection is then either automatically or upon election of the calling party completed to a call coverage point at step 213, and the calling party can then leave a voice mail message at step 214 for the subscriber or hang up and attempt to reach the subscriber at the conclusion of the call redirection period as identified by the cellular call redirection system 200.

The cellular call redirection system 200 continues to automatically decrement the data stored in memory that is indicative of the time remaining for the implementation of the call redirection feature until the time period expires and the feature is automatically deactivated by the cellular call redirection system 200 and incoming calls to the mobile subscriber station 110 are processed in the conventional manner. The cellular call redirection system 200 can also maintain a queue of telephone numbers of the calling parties who attempted to reach the subscriber during the operation of the call redirection feature and transmit an indication to the mobile subscriber station 110 of the number of calls that were redirected.

Summary

The cellular call redirection system enables a subscriber to redirect all incoming calls directed to the subscriber's cellular telephone to an automated message system for a predetermined period of time. In addition, the calling party is connected to a voice announcement system which plays a message to the calling party to inform the calling party that the call has been redirected and provides information regarding the time remaining before the call redirection feature is automatically deactivated.

The invention claimed is:

1. A cellular call redirection system for providing subscriber activated, time limited redirection of incoming calls, comprising:

call redirection activation means, responsive to receipt of a call redirection signal from a subscriber's mobile subscriber station, for activating a call redirection feature to forward subsequently received incoming calls that are directed to said subscriber's mobile subscriber station to a predetermined automated message system destination;

timer means for storing data received from said subscriber indicative of a length of time that said call redirection feature is to remain operational;

call redirection means, responsive to receipt of an incoming call directed to said subscriber's mobile subscriber station during said length of time that said call redirection feature is to remain operational, for forwarding said incoming call to said predetermined automated message syatem destination; and announcement means for transmitting a message to a calling party on said incoming call that indicates the present activation of the call redirection feature and the length of time remaining that said call redirection feature is to remain operational.

2. The cellular call redirection system of claim 1 further comprising:

timer decrementing means, for decrementing said data received from said subscriber indicative of a length of time that said call redirection feature is to remain operational to maintain an indication of a length of time remaining that said call redirection feature is to remain operational.

3. The cellular call redirection system of claim 2 further comprising:

call redirection termination means, responsive to said timer decrementing means, for automatically deactivating said call redirection feature upon conclusion of said length of time that said call redirection feature is to remain operational.

4. The cellular call redirection system of claim 1 further comprising:

authorization means, responsive to a reception of said call redirection signal, for determining whether said called party is provisioned for said call refusal service; and service denial means, responsive to a determination that said called party is not provisioned to receive said call refusal service, for disabling said means for establishing.

5. A method of operating a cellular call redirection system for providing subscriber activated, time limited redirection of incoming calls, comprising:

activating, in response to receipt of a call redirection signal from a subscriber's mobile subscriber station, a call redirection feature to forward subsequently received incoming calls that are directed to said subscriber's mobile subscriber station to a predetermined automated message system destination;

storing data received from said subscriber indicative of a length of time that said call redirection feature is to remain operational;

forwarding, in response to receipt of an incoming call directed to said subscriber's mobile subscriber station during said length of time that said call redirection feature is to remain operational, said incoming call to said predetermined automated message system destination; and transmitting a message to a calling party on said incoming call that indicates the present activation of the call redirection feature and the length of time remaining that said call redirection feature is to remain operational.

6. The method of operating a cellular call redirection system of claim 5 further comprising:

decrementing said data received from said subscriber indicative of a length of time that said call redirection feature is to remain operational to maintain an indication of a length of time remaining that said call redirection feature is to remain operational.

7. The method of operating a cellular call redirection system of claim 6 further comprising:

automatically deactivating, in response to said timer decrementing, said call redirection feature upon conclusion of said length of time that said call redirection feature is to remain operational.

8. The method of operating a cellular call redirection system of claim 5 further comprising:

determining, in response to a reception of said call redirection signal, whether said called party is provisioned for said call refusal service; and disabling, in response to a determination that said called party is not provisioned to receive said call refusal service, said call refusal service.

* * * * *